United States Patent [19]
Gerken

[11] Patent Number: 6,102,183
[45] Date of Patent: Aug. 15, 2000

[54] MOTORCYCLE CLUTCH AND CLUTCH RELEASE

[75] Inventor: Roland J. Gerken, Andover, Minn.

[73] Assignee: Excelsior-Henderson Motorcycle Manufacturing Company, Belle Plaine, Minn.

[21] Appl. No.: 09/235,931

[22] Filed: Jan. 22, 1999

[51] Int. Cl.[7] ............................................. F16D 25/08
[52] U.S. Cl. ................................. 192/91 A; 192/110 R
[58] Field of Search ............................ 192/91 A, 89.24, 192/89.26, 85 CA, 70.25, 110 R

[56] References Cited

U.S. PATENT DOCUMENTS

| | | | |
|---|---|---|---|
| 4,030,575 | 6/1977 | Moring et al. | 192/91 A X |
| 4,366,887 | 1/1983 | Hofbauer et al. | 192/85 CA X |
| 4,518,070 | 5/1985 | Ooka | 192/85 CA |
| 4,565,269 | 1/1986 | Kawasaki et al. | 192/85 CA X |
| 4,566,577 | 1/1986 | Tsuboi | 192/85 CA |
| 4,573,561 | 3/1986 | Deem et al. | 192/91 A |
| 4,732,251 | 3/1988 | Tipton | 192/70.24 |
| 4,964,504 | 10/1990 | Friedmann | 192/91 A X |
| 5,205,287 | 4/1993 | Checa | 192/85 CA |
| 5,303,806 | 4/1994 | Kajitani et al. | 192/91 A X |
| 5,361,882 | 11/1994 | Tipton | 192/70.24 |
| 5,366,054 | 11/1994 | Cooke et al. | 192/91 A X |

*Primary Examiner*—Rodney H. Bonck
*Attorney, Agent, or Firm*—Schwegman, Lundberg, Woessner & Kluth, P.A.

[57] ABSTRACT

A hydraulic motorcycle clutch system includes a master cylinder, and a slave cylinder. The slave cylinder operates as a clutch release mechanism to disengage a clutch in response to the master cylinder. The clutch release provides a pulling force on the clutch to relieve a compression force applied to clutch disks of the clutch. One embodiment of the slave cylinder includes dual concentric seals and a stepped piston. The stepped piston design provides for reliable control of the travel distance of the clutch release. The clutch release is also self adjusting over a wide variation in clutch disk thicknesses.

18 Claims, 7 Drawing Sheets

MOTORCYCLE CLUTCH AND CLUTCH RELEASE

TECHNICAL FIELD OF THE INVENTION

The present invention relates generally to engine clutch assemblies and in particular the present invention relates to a hydraulic motorcycle engine clutch and clutch release assembly.

BACKGROUND OF THE INVENTION

Clutch assemblies are generally known in the transportation industries and are used to couple an engine to an input of a transmission for providing motion to a vehicle, such as a motorcycle. A typical clutch couples an engine crank shaft to an input shaft of the transmission by using numerous spring loaded friction disks, or plates. Some of the disks are mechanically coupled to the input shaft of the transmission, while other disks are coupled to the engine crank shaft via a gear mechanism, or the like. The transmission input shaft rotates in response to rotation of the engine crank shaft when the friction disks are compressed together. To decouple the input shaft of the transmission, a compression force is removed from the friction disks such that friction between adjacent disks is reduced.

To remove or reduce the compression on the clutch disks, a clutch release mechanism is typically provided. In a motorcycle application, the release mechanism is activated using a clutch lever attached to the motorcycle handle bars. The clutch lever is attached to the clutch released mechanism using either a cable or a hydraulic line. While cables can provide satisfactory operation, numerous problems can be experienced over the lifetime of the vehicle, such as broken, stretched, and stuck cables. Therefore, hydraulic activation is often preferred which reduce or eliminate these types of problems.

Hydraulic clutch systems work by using a master cylinder, which contains hydraulic fluid, to force a predetermined amount of hydraulic fluid into the release mechanism via a hydraulic line. A typical hydraulic clutch release mechanism operates by moving a push rod which extends through the center of a transmission input shaft. The push rod pushes on the clutch to relieve compression applied to the clutch disks. This requires that the clutch release mechanism be located on an opposite side of the transmission than the clutch itself. Thus, the transmission is located between the release and the clutch. This application can be difficult to implement in motorcycles which use a rear wheel belt drive system. That is, an output shaft of the transmission, in combination with a rear wheel drive pulley, may not leave sufficient room for a hydraulic release mechanism which pushes a rod through the input shaft to release the clutch.

For the reasons stated above, and for other reasons stated below which will become apparent to those skilled in the art upon reading and understanding the present specification, there is a need in the art for a hydraulically activated clutch release mechanism which can be located adjacent to the clutch disks and does not require a push rod.

SUMMARY OF THE INVENTION

The above mentioned problems with engine clutches and other problems are addressed by the present invention and will be understood by reading and studying the following specification. An engine clutch assembly is described which uses hydraulic pressure to release the clutch with a pulling force.

In particular, one embodiment of the present invention describes a motorcycle clutch release comprising a housing having a cylinder formed therein, a piston sized to slidably fit within the cylinder, a pair of hydraulic seals attached to either the housing cylinder or the piston, and a pull rod attached to the piston and adapted to pull on a clutch to disengage the clutch in response to movement of the piston.

In another embodiment, a motorcycle clutch release comprises a housing having a stepped cylinder formed therein such that a first end of the cylinder has a first diameter and an opposite end of the cylinder has a second diameter. The cylinder has a first circumferentially extending groove located at the first end and a second circumferentially extending groove located at the first end. The first and second circumferentially extending grooves are each adapted to respectively hold first and second seals. The motorcycle clutch release further comprises a stepped piston located within the cylinder and sized to slidably fit within the first and second seals. The stepped piston has a first end located in the first end of the cylinder and a second end located in the second end of the cylinder. A ledge is provided between the first and second ends of the piston and located between the first and second seals. The motorcycle clutch release also comprises a pull rod attached to the piston and adapted to pull on a clutch to disengage the clutch in response to movement of the piston.

In yet another embodiment, a motorcycle clutch system comprises a clutch having a plurality of clutch disks, and a pressure plate for providing a compression force to the plurality of clutch disks, and a hydraulic clutch release coupled to the clutch and located adjacent to the pressure plate. The hydraulic clutch release comprises a housing having a cylinder formed therein, a piston sized to slidably fit within the cylinder, a pair of hydraulic seals attached to either the housing cylinder or the piston, and a pull rod attached to the piston and adapted to provide a pulling force on the pressure plate to disengage the clutch in response to movement of the piston.

BRIEF DESCRIPTION OF THE DRAWINGS

FIG. 1b is a side view of the motorcycle of FIG. 1a;

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that mechanical changes may be made without departing from the spirit and scope of the present inventions. The following detailed description is, therefore, not to be taken in a limiting sense, and the scope of the present invention is defined only by the appended claims.

Figure 1A:
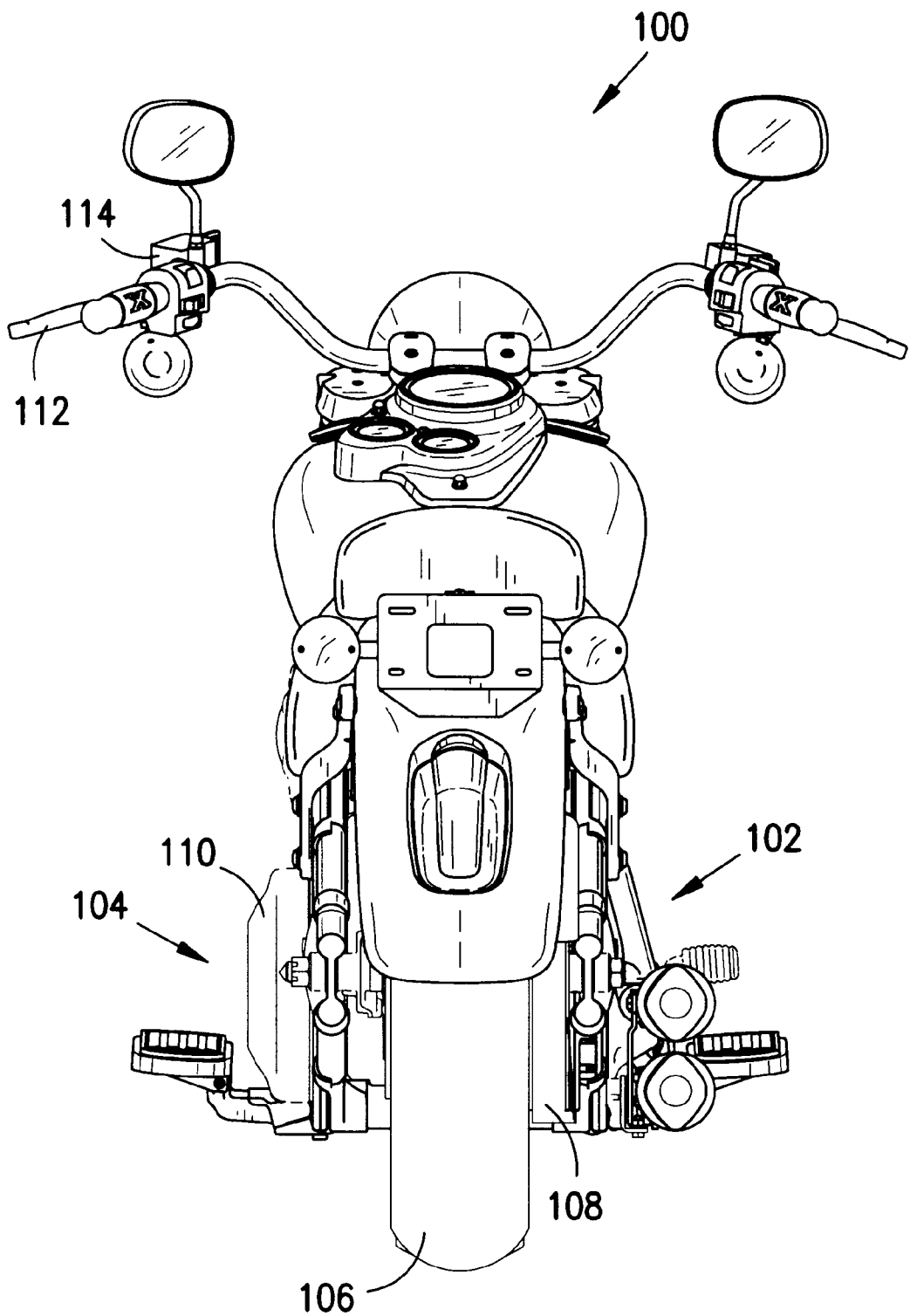
FIG. 1a is a rear view of a motorcycle incorporating the present invention.
Figure 1B:
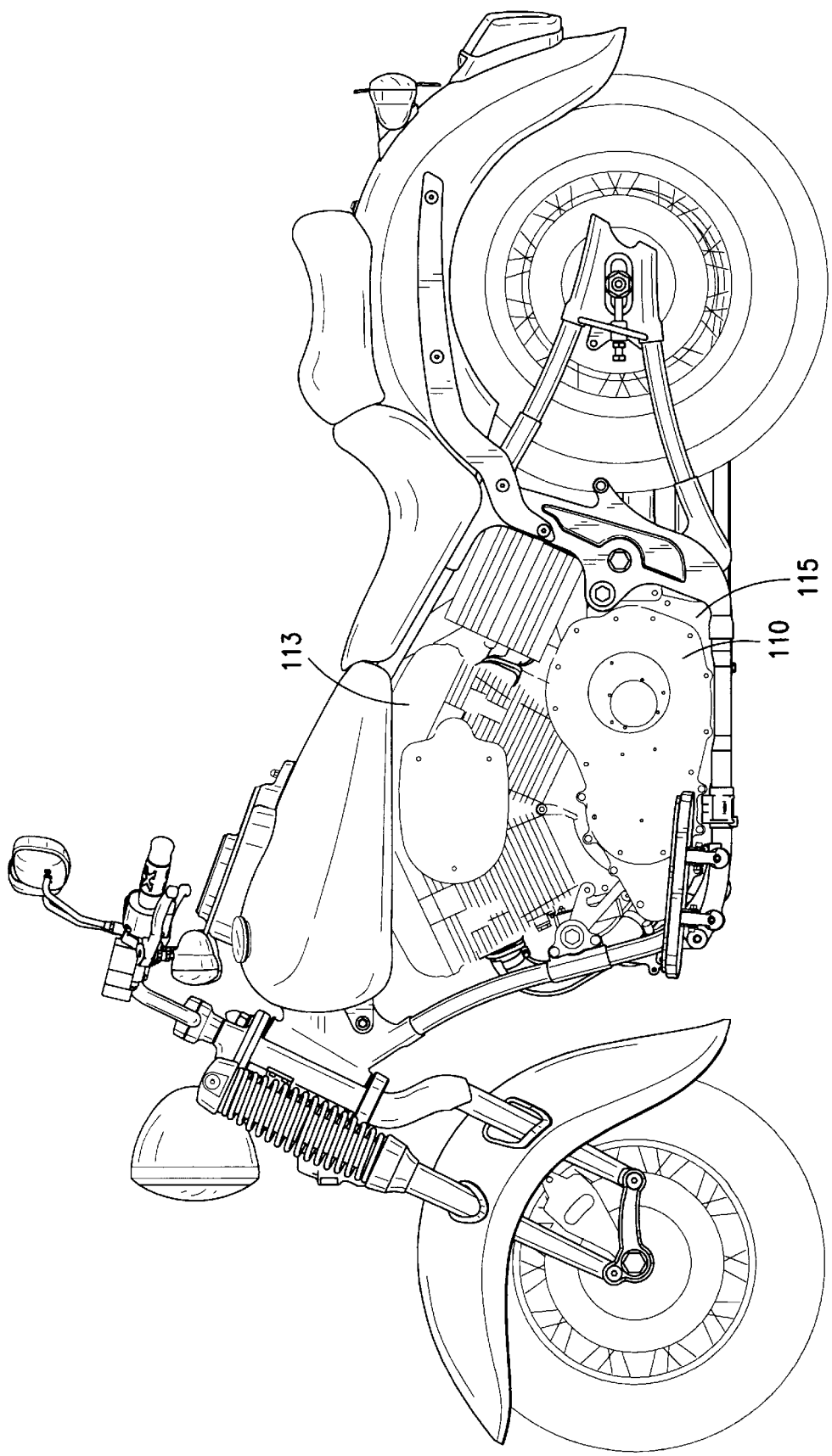

Referring to FIG. 1a, a rear view of a motorcycle 100 incorporating the present invention is illustrated. The motorcycle includes a rear wheel drive side 102, and a transmission clutch side 104. The rear wheel 106 is rotated by a drive belt 108, or the like, located on the rear wheel drive side 102. A clutch lever 112 is provided on the motorcycle handle bar to activate a hydraulic master cylinder 114. The hydraulic master cylinder operates a clutch release mechanism located generally at location 110. It is noted that the clutch release mechanism is located on the opposite side of the motorcycle from the rear wheel drive belt. As shown in FIG. 1b, the motorcycle includes an engine 113 and a transmission 115. The transmission has an output side coupled to the drive belt 108 and an input side coupled to the clutch.

Figure 2:
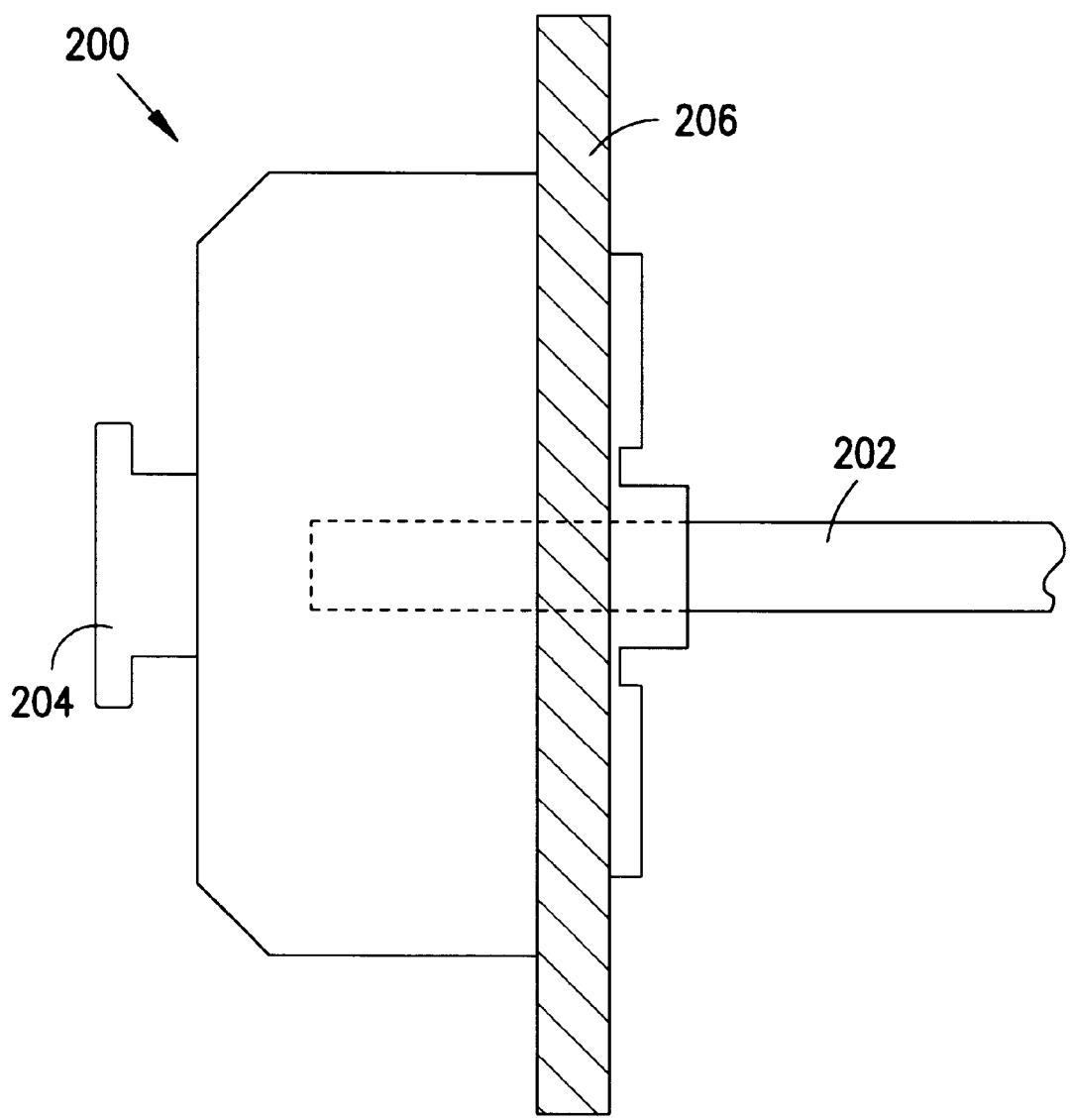
FIG. 2 is a simplified drawing of a motorcycle clutch and release.

FIG. 2 generally illustrates a top view of a clutch 200, a clutch release 204, and a transmission input shaft 202. In operation, portions of the clutch can be rotated in response to a crank shaft of an engine (not shown) via gear 206. When the clutch is engaged, transmission input shaft 202 can be rotated in response to gear 206. To decouple the input shaft 202 from gear 206, the clutch release 204 is activated in response to the hydraulic master cylinder 114 (FIG. 1). A more detailed description of both the clutch and the clutch release is provided herein.

Figure 3:
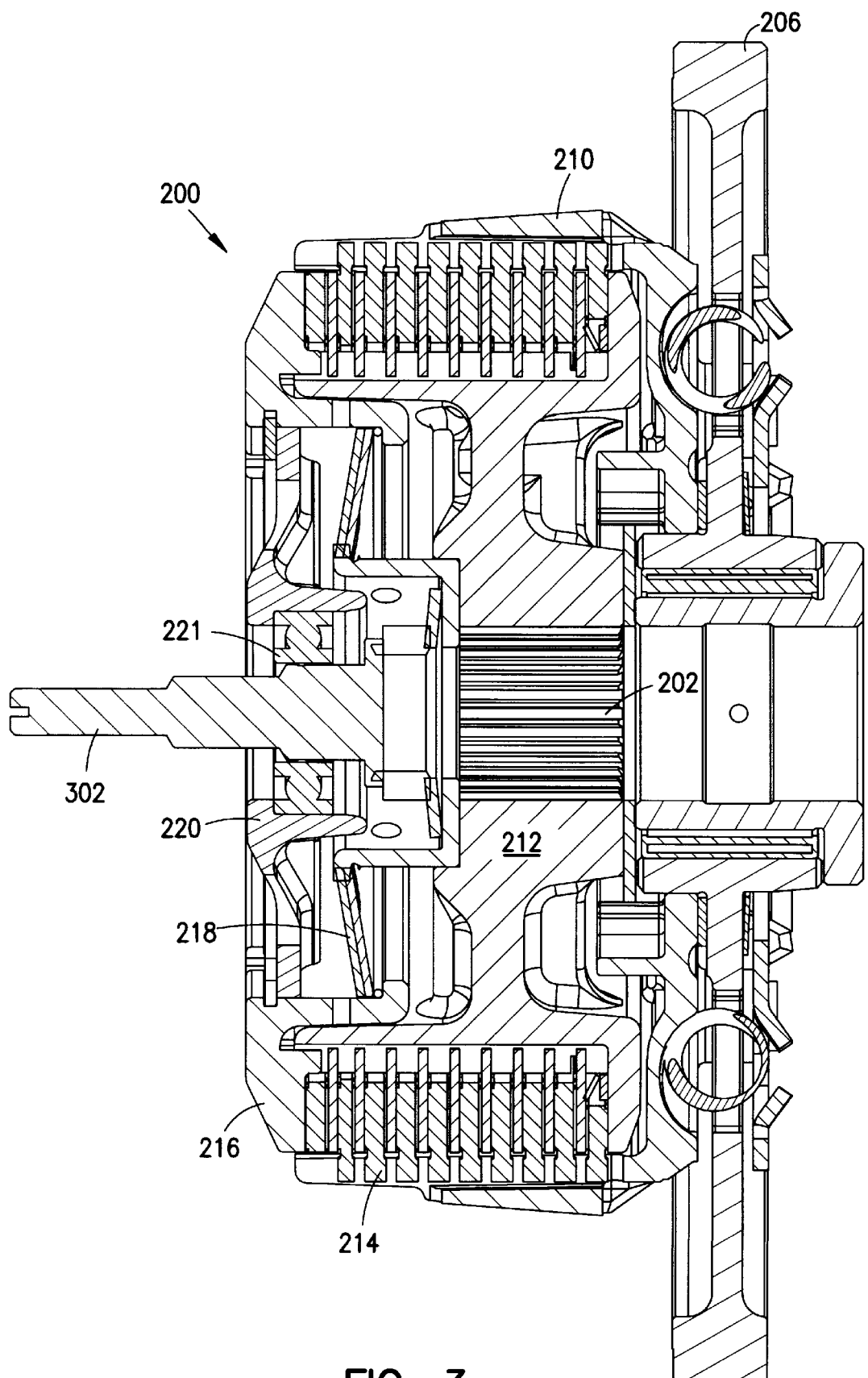
FIG. 3 is a more detailed cross-section of a motorcycle clutch.

Referring to FIG. 3, a cross section view of a clutch 200 is illustrated and a general description of clutch 200 is provided. It will be appreciated that the basic operation of clutches are well understood in the art. The description of the clutch, therefore, is but one embodiment of a clutch provided to explain the present invention and has been simplified to focus on the present invention. The clutch includes a housing 210, generally referred to as a basket, which is mechanically coupled to gear 206. Thus, the clutch basket rotates in response to a rotation of gear 206. As stated above, gear 206 is coupled to the engine and rotates in response to a crank shaft of the motorcycle engine. The clutch also includes a center hub 212 which is engaged with the transmission input shaft 202. A stack of clutch disks 214 are provided within the clutch. It will be understood that the term "disks" includes plates, or other rotating friction surfaces. Some of the clutch disks are engaged with the clutch basket 210 and some of the disks are engaged with center hub 212. Typically, every other one of the disks is engaged with the basket. Likewise, every other one of the disks is engaged with the center hub. Each clutch disk includes friction surfaces which are in contact with friction surfaces of adjacent disks. Because the disks are lubricated by oil during operation, adjacent disks are free to independently rotate with either the basket for the center hub, depending upon which one they are engaged with. It is noted that not all clutches are wet, lubricated by oil, and the present invention can be practiced with any type of clutch. If a compression force between the adjacent disks is sufficient, the disks cannot independently rotate but will rotate together. Thus, the rotation of disks which are being actively rotated will be transferred to the adjacent disks. The disks coupled to the basket are considered "master" disks, while the disks coupled to the center hub are "slave" disks. That is, the disks coupled to the center hub rotate in response to rotation of the master disks.

A pressure plate 216 and diaphragm springs 218 provide a pre-loaded compressing force on the stack of clutch disks such that any rotation experienced by the clutch basket is transferred to the center hub 212. Again, different types of springs can be used and the present inventoin can be used with clutches not having diaphragm springs. To disengage the clutch, the pressure plate is moved away from the disks to relieve the compression force on the stack of clutch disks. To move the pressure plate, a pull rod 302 is coupled to the pressure plate via an intermediate lift plate 220. The pull rod is engaged to the clutch release, as described in greater detail below. Thus, the clutch is released by pulling the pressure plate away from the clutch disk stack using the clutch release.

Figure 4:
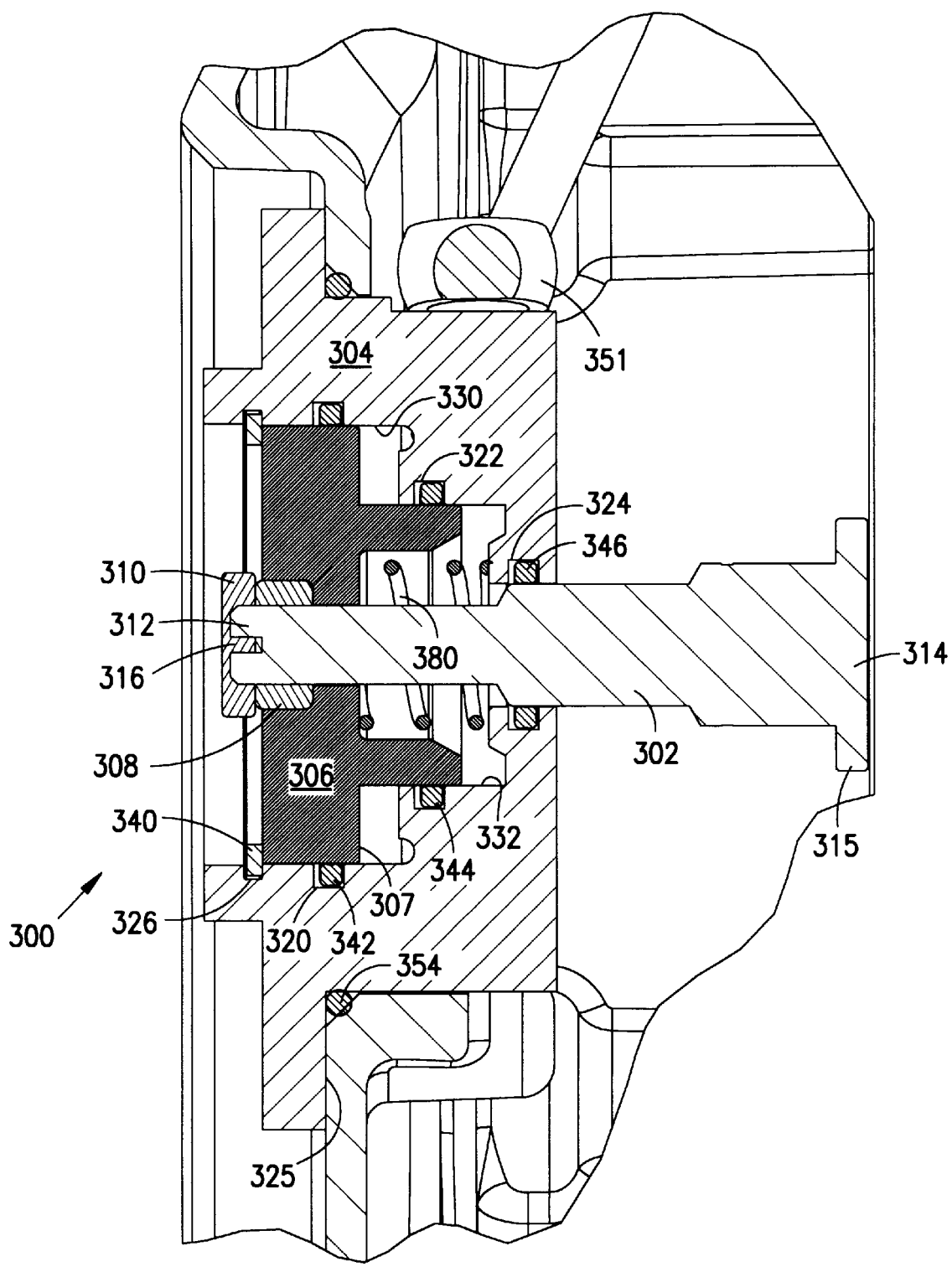
FIG. 4 is the detailed cross-section of one embodiment of the clutch release mechanism of FIG. 2.

One embodiment of clutch release 300 is illustrated in FIG. 4. The clutch release includes a housing 304 and a piston 306. The housing and piston combination form a hydraulic slave cylinder which is operated in response to the motorcycle master cylinder 114 (FIG. 1a). Pull rod 302 is attached to the piston such that when the clutch release is activated, the pull rod relieves pressure applied to the clutch disks by pulling lift plate 220 (FIG. 3) in a direction away from the clutch disks. The clutch release housing 304 includes a cylinder having inner diameter surfaces 330 and 332 sized to accept the piston. Circumferential grooves 320 and 322 are provided to accept hydraulic seals 342 and 344, respectively. Because the clutch operates in engine oil, the housing also includes a groove 324 for an oil seal 346 which provides a seal around the pull rod when assembled. The housing 304 includes a groove 326 to accept retaining ring 340. The retaining ring insures that the piston cannot be removed from the housing during operation. It will be appreciated that alternate methods of providing an outside stop for the piston can be incorporated, and the present invention is not limited to a retaining ring.

Figure 5:
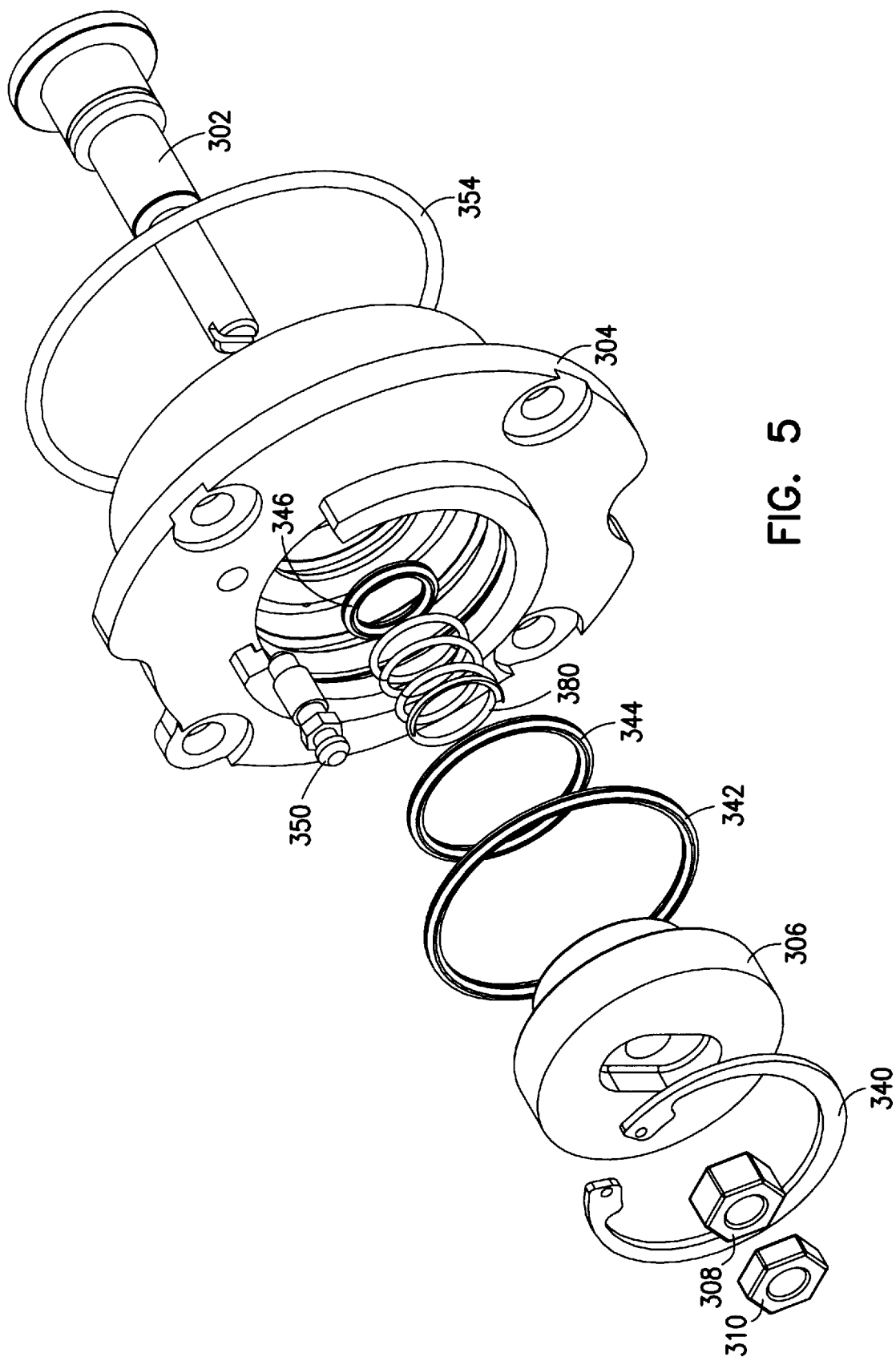
FIG. 5 is a perspective assembly view of portions of the clutch release mechanism of FIG. 4.
Figure 6:
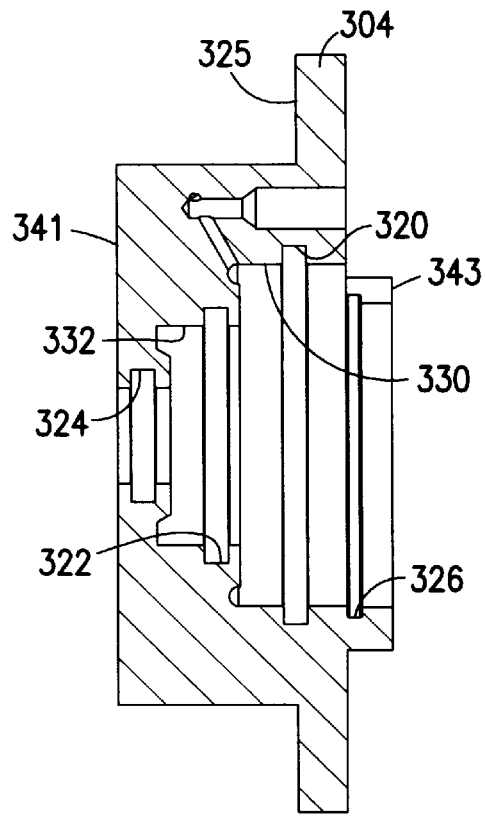
FIG. 6 is a cross section of the clutch release housing of FIG. 4.

Referring to FIG. 4, hydraulic fluid is provided through fluid supply input 351 from the clutch master cylinder during operation. The fluid is forced into the inside of the housing between the two seals 342 and 344. This fluid acts upon the piston to force the piston and attached pull rod toward the retaining ring. The pull rod, therefore, moves the pressure plate a sufficient amount to allow the clutch disks to release and decouple the transmission input shaft. The piston is sized, as described below, to move the pull rod a predetermined amount, for example two millimeters. The housing further includes a shoulder 325 provided to mount the housing to the motorcycle using o-ring 354. For purposes of reference, the housing has an inside surface 341 provided adjacent to the clutch and an outside surface 343 located away from the clutch (FIG. 6). A hydraulic bleeder fitting 350 (FIG. 5) is provided to purge air from both the master and slave release cylinders.

The pull rod 302 has a first end 3 14 including a shoulder 315 which is coupled to the lift plate via a bearing 221 (FIG. 3). The pull rod also has an opposite threaded end 312 which couples to the piston 306. The threaded end can be coupled to the piston using threaded nuts 310 and 308. A slot 316 is provided in the end of the pull rod to facilitate adjusting the pull rod to the lift plate upon assembly. Alternative pull rods are contemplated herein. For example, a pull rod could be implemented which threads into the lift plate and includes a shoulder, or the like, for engaging with the release piston 306. Alternatively, the release plate of the clutch could be incorporated into the pressure plate to reduce components. Thus, numerous methods of coupling the clutch pressure plate to the release piston can be utilized without departing from the present invention.

The clutch release mechanism includes a slave piston 306 which is activated in response to the clutch master cylinder.

Figure 7:
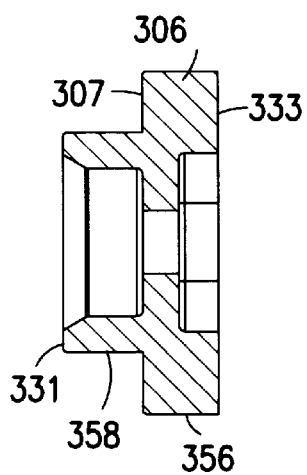
FIG. 7 is a cross section of the clutch release piston of FIG. 4.

Piston 306 is generally round in shape and has a stepped outside surface to define a ledge, or pressure surface 307, as illustrated in FIG. 7. The piston outside diameter surfaces 356 and 358 are in contact with hydraulic seals when installed in the housing 304 (FIG. 6) and act as first and second bearing surfaces, respectively, during operation. As such, the piston is preferably fabricated from a material which resists wear, such as stainless steel or nickel plated steel. The piston has an opening extending axially through the piston, from and inside surface 331 to an outside surface 333, which allows the pull rod to pass through the piston as shown in FIG. 4. This embodiment allows for easy adjustment of the distance between the pull rod shoulder 315 and the release piston 306. Alternate embodiments of the piston can be used. For example, a piston having an outside diameter surface which is not stepped could be used. A piston of this design, however, could be susceptible to binding with the inside surface of the housing, and/or the seals. It will also be appreciated by those skilled in the art, with the benefit of the present disclosure, that the hydraulic seals can be located in the piston and not in the housing. In an embodiment were the seals are located in the piston, the release housing 304 should be constructed of a material which resists wear from the piston and seals.

Because the lift plate needs to be moved a predetermined distance, the difference in the piston outside diameters are carefully selected. That is, assuming the master cylinder provides a volume X of fluid, an area of pressure surface 307 will determine the travel of the piston when the clutch release is activated. In one embodiment, the master cylinder provides approximately 2 cm$^3$ of fluid volume, the area between the piston diameters is 900 mm$^2$, and the length of travel is approximately 2 mm.

Referring again to FIG. 4, the assembly of the clutch system is described. The pull rod 302 is first attached to the lift plate of the clutch. The clutch release housing (including seals and the piston) is then mounted to a cover of the clutch with the pull rod passing through the piston. The pull rod is then attached to the piston using nuts 308 and 310. It is noted that slot 316 allows for easy adjustment of the pull rod. Using the master cylinder, the piston is forced toward the retaining ring 340 until it is seated against the retaining ring. The nuts (adjusting 308 and lock 310 nuts) are then threaded onto the pull rod until shoulder 315 is engaged with the lift plate. Adjusting nut 308 is threaded an additional amount to provide a predetermined distance (about 2 mm) between the piston and retaining ring 340. Lock nut 310 is then tightened to keep nut 308 in place. By adjusting the release in this manner, the release is self adjusting as the clutch plates become worn. That is, the thickness of the clutch disks is reduced over the life of the clutch. This reduced thickness effectively pulls the pull rod 302 and piston 306 further into the housing cylinder. The release, however, does not need to be adjusted. The release will self adjust until the clutch is worn to a point where the bottom of the piston reaches the bottom of the housing cylinder. A properly selected housing cylinder depth will insure that there is sufficient adjustment distance in the release to compensate for all expected wear in the clutch.

An alternate embodiment of a clutch release mechanism is illustrated in the Figures as including an optional spring 380. The release is similar to the clutch release described above, with the addition of a coil spring 380. The coil spring is located between the release piston in the release housing to reduce free play which could be experienced between the piston in the pull rod.

CONCLUSION

A hydraulic motorcycle clutch system has been described which includes a master cylinder, and a slave cylinder. The slave cylinder operates as a clutch release mechanism to disengage a clutch in response to the master cylinder. The clutch release provides a pulling force to the clutch to relieve a compression force applied to clutch disks of the clutch. One embodiment of the slave cylinder includes dual concentric seals and a stepped piston. The stepped piston design provides for reliable control of the travel distance of the clutch release. In addition, the clutch release is self adjusting over a wide variation in clutch disk thicknesses.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A motorcycle clutch release comprising:

a housing having a cylinder formed therein;

a piston sized to slidably fit within the cylinder;

a pair of hydraulic seals attached to either the housing cylinder or the piston; and an adjustable pull rod having a first end attached to the piston and a second end adapted to pull on a clutch pressure plate to disengage the clutch in response to movement of the piston, the adjustable pull rod passes through an opening in the piston and is coupled to the piston to allow for adjustment between the piston and the second end of the pull rod.

2. The motorcycle clutch release of claim 1 wherein the piston has a stepped outside surface to form a pressure surface located between the pair of hydraulic seals.

3. The motorcycle clutch release of claim 1 wherein the first end of the pull rod is threaded a attached to the piston using a threaded nut, and the second of has a shoulder to couple to the clutch pressure plate.

4. The motorcycle clutch release of claim 1 further including a spring located between the housing and the piston to reduce slack in the movement of the piston.

5. A motorcycle clutch release comprising:

a housing having a stepped cylinder formed therein such that a first end of the cylinder has a first diameter and an opposite end of the cylinder has a second diameter, the cylinder has a first circumferentially extending groove located at the first end and a second circumferentially extending groove located at the first end, the first and second circumferentially extending grooves are each adapted to respectively hold first and second seals;

a substantially solid stepped piston located within the cylinder and sized to slidably fit within the first and second seals, the stepped piston has a first end located in the first end of the cylinder and a second end located in the second end of the cylinder, a ledge is provided between the first and second ends of the piston and located between the first and second seals;

an adjustable pull rod having a first end attached to the piston and a second end adapted to pull on a clutch pressure plate to disengage the clutch in response to movement of the piston, the adjustable pull rod passes through central openings in the housing and the piston, and the adjustable pull rod is coupled to the piston to allow for adjustment between the piston and the second end of the adjustable pull rod; and a third seal located between the housing and the adjustable pull rod.

6. The motorcycle clutch release of claim 5 further comprising a piston retaining ring located in the first end of the housing cylinder.

7. The motorcycle clutch release of claim 5 further comprising a spring located between the housing and the piston to reduce slack in the movement of the piston.

8. The motorcycle clutch release of claim 5 wherein a surface area of the ledge is selected to move the piston a predefined distance in response to a defined volume of fluid provided to the motorcycle clutch release.

9. A motorcycle clutch system comprising:

a clutch having a plurality of clutch disks, and a pressure plate for providing a compression force to the plurality of clutch disks; and a hydraulic clutch release coupled to the clutch and located adjacent to the pressure plate, the hydraulic clutch release comprising, a housing having a cylinder formed therein;

a piston sized to slidably fit within the cylinder;

a pair of hydraulic seals attached to either the housing cylinder or the piston; and an adjustable pull rod having a first end attached to the piston and a second end adapted to provide a pulling force on the pressure plate to disengage the clutch in response to movement of the piston, the adjustable pull rod passes through a central opening in the piston and is coupled to the piston to allow for adjustment between the piston and the pressure plate.

10. The motorcycle clutch system of claim 9 wherein the housing cylinder comprises a stepped cylinder wherein a first end of the cylinder has a first diameter and an opposite end of the cylinder has a second diameter, the cylinder has a first circumferentially extending groove located at the first end and a second circumferentially extending groove located at the first end, the first and second circumferentially extending grooves are each adapted to respectively hold first and second seals of the pair of hydraulic seals.

11. The motorcycle clutch system of claim 10 wherein the piston is sized to slidably fit within the first and second seals, the stepped piston has a first end located in the first end of the cylinder and a second end located in the second end of the cylinder, a ledge is provided between the first and second ends of the piston and located between the first and second seals.

12. The motorcycle clutch system of claim 11 wherein a surface area of the ledge is selected to move the piston a predefined distance in response to a defined volume of fluid provided to the motorcycle clutch release by a master cylinder.

13. The motorcycle clutch system of claim 9 wherein the hydraulic clutch release further comprises a spring located between the housing and the piston to reduce slack in the movement of the piston.

14. A motorcycle comprising:

an engine;

a transmission;

a clutch coupled to the engine and transmission for engaging the engine and transmission;

a clutch master cylinder; and a clutch release slave cylinder coupled to the clutch and operable in response to the clutch master cylinder, the clutch release slave cylinder is located such that the clutch is coupled between the clutch release slave cylinder and the transmission, the clutch release slave cylinder comprises:

a housing having a cylinder formed therein;

a piston sized to slidably fit within the cylinder;

a pair of hydraulic seals attached to either the housing cylinder or the piston; and an adjustable pull rod having a first end attached to the piston and a second end adapted to pull on a pressure plate the clutch to disengage the transmission from the engine in response to movement of the piston the adjustable pull rod passes through a central opening in the piston and is coupled to the piston to allow for adjustment between the piston and the pressure plate.

15. The motorcycle of claim 14 wherein the housing cylinder comprises a stepped cylinder wherein a first end of the cylinder has a first diameter and an opposite end of the cylinder has a second diameter, the cylinder has a first circumferentially extending groove located at the first end and a second circumferentially extending groove located at the first end, the first and second circumferentially extending grooves are each adapted to respectively hold first and second seals of the pair of hydraulic seals.

16. The motorcycle of claim 15 wherein the piston is sized to slidably fit within the first and second seals, the stepped piston has a first end located in the first end of the cylinder and a second end located in the second end of the cylinder, a radially extending ledge is provided between the first and second ends of the piston and positioned between the first and second seals.

17. The motorcycle of claim 16 wherein a surface area of the ledge is selected to move the piston a predefined distance in response to a defined volume of fluid provided to the clutch release slave cylinder by the clutch master cylinder.

18. The motorcycle of claim 14 wherein the clutch release slave cylinder further comprises a spring located between the housing and the piston to reduce slack in the movement of the piston.

* * * * *